United States Patent
Lee et al.

(10) Patent No.: US 9,382,400 B2
(45) Date of Patent: Jul. 5, 2016

(54) POLYCARBONATE COMPOSITION AND HEAT SHIELDING MATERIAL MADE THEREFROM

(71) Applicant: CHI MEI CORPORATION, Tainan (TW)

(72) Inventors: Shu-Chi Lee, Tainan (TW); Heng-Bo Chiang, Tainan (TW); Chia-Hon Tai, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 176 days.

(21) Appl. No.: 14/134,014

(22) Filed: Dec. 19, 2013

(65) Prior Publication Data

US 2014/0175324 A1     Jun. 26, 2014

(30) Foreign Application Priority Data

Dec. 26, 2012   (TW) .............................. 101150151 A

(51) Int. Cl.
| | |
|---|---|
| C08L 69/00 | (2006.01) |
| C08K 3/22 | (2006.01) |
| C08J 5/00 | (2006.01) |
| B32B 27/36 | (2006.01) |
| B60J 1/00 | (2006.01) |

(52) U.S. Cl.
CPC ........... *C08K 3/22* (2013.01); *C08K 2003/2258* (2013.01)

(58) Field of Classification Search
CPC .................................. C08L 69/00; C08K 3/22
See application file for complete search history.

(56) References Cited

U.S. PATENT DOCUMENTS 8,304,099 B2 * 11/2012 Chung et al. .................. 428/701

FOREIGN PATENT DOCUMENTS

JP       2008-214596       * 9/2008

OTHER PUBLICATIONS

Translation for JP 2008-214596, Sep. 18, 2008.*

* cited by examiner

*Primary Examiner* — Carol M Koslow
(74) *Attorney, Agent, or Firm* — Nixon & Vanderhye P.C.

(57) ABSTRACT

A polycarbonate composition includes a terminal hydroxy-containing polycarbonate and a halogen-containing alkali metal tungsten oxide of formula (I) in an amount ranging from 0.007 wt % to 0.09 wt % based on a total weight of the polycarbonate composition. The Formula (I) is represented as follows:

$$M_xWO_{3-y}L_y \quad \text{(I)}$$

where M represents an alkali metal, W represents tungsten, L represents halogen, $0.001 \leq x \leq 1$, and $0 < y \leq 0.5$.

10 Claims, No Drawings

POLYCARBONATE COMPOSITION AND HEAT SHIELDING MATERIAL MADE THEREFROM

CROSS-REFERENCE TO RELATED APPLICATION

This application claims priority of Taiwanese Application No. 101150151, filed on Dec. 26, 2012.

BACKGROUND OF THE INVENTION

1. Field of the Invention

This invention relates to a polycarbonate composition, more particularly to a polycarbonate composition which is suitable for forming into a heat shielding material and which includes a terminal hydroxyl-containing polycarbonate and a halogen-containing alkali metal tungsten oxide.

2. Description of the Related Art

In recent years, as awareness of environmental protection increases, how to save an energy source has become an important issue. The use of a heat shielding material is one of the methods for saving the energy source, and may provide a shelter from sunshine and inhibit the temperature rise. Furthermore, the use of an air condition may be decreased. Therefore, the heat shielding material has become a good tool for saving the energy source.

JP 2008-214596 discloses a polycarbonate composition and a heat shielding material made from the same. The polycarbonate composition includes 100 parts by weight of terminal hydroxyl-containing polycarbonate and 0.001 to 5 parts by weight of tungsten oxide. The tungsten oxide is represented by Formula (a) as follows:

$$M_aW_bO_c \qquad (a)$$

where M represents hydrogen, helium, alkaline earth metals, alkali metals, rare-earth metals, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Hf, Os, Bi, or I; W represents tungsten; 0.001≤a/b≤1; and 2.2≤a/b≤3.

Embodiments of JP 2008-214596 disclose the use of 0.15 part by weight and 0.24 part by weight of the tungsten oxide, and a sum of a visible light transmittance and an infrared shielding ratio of the heat shielding material made therefrom ranges from 134% to 136%, and a haze value of the heat shielding material ranges from 0.9% to 2.4%. Although the sum of the visible light transmittance and the infrared shielding ratio of the heat shielding material in JP 2008-214596 ranges from 134% to 136%, the infrared shielding ratio of the heat shielding material added with 0.24 part by weight of the tungsten oxide is increased to 76.2%, which still could not meet industrial requirements.

SUMMARY OF THE INVENTION

Therefore, a first object of the present invention is to provide a polycarbonate composition.

A second object of the present invention is to provide a heat shielding material with low haze value and superior heat shielding effect.

According to a first aspect of the present invention, there is provided a polycarbonate composition that includes a terminal hydroxy-containing polycarbonate and a halogen-containing alkali metal tungsten oxide of formula (I) in an amount ranging from 0.007 wt % to 0.09 wt % based on a total weight of the polycarbonate composition, $$M_xWO_{3-y}L_y \qquad (I)$$

where M represents an alkali metal, L represents halogen, 0.001≤x≤1, and 0<y≤0.5.

According to a second aspect of the present invention, there is provided a heat shielding material made from the aforementioned polycarbonate composition.

DETAILED DESCRIPTION OF THE PREFERRED EMBODIMENTS

Other features and advantages of the present invention will become apparent in the following detailed description of the preferred embodiment.

A polycarbonate composition according to this invention includes:

a terminal hydroxyl-containing polycarbonate which has a weight average molecular weight ranging from 15,000 to 50,000, and has a terminal hydroxy amount ranging from 2 ppm to 1,000 ppm based on a weight of the terminal hydroxy-containing polycarbonate; and a halogen-containing alkali metal tungsten oxide of formula (I) in an amount ranging from 0.007 wt % to 0.09 wt % based on a total weight of the polycarbonate composition, $$M_xWO_{3-y}L_y \qquad (I)$$

where M represents an alkali metal; L represents halogen; 0.001≤x≤1, and 0<y≤0.5.

When the halogen-containing alkali metal tungsten oxide represented by Formula (I) is used in an amount less than 0.007 wt %, a heat shielding material made from the polycarbonate composition has low infrared shielding ratio so as to result in inferior heat shielding effect. When the halogen-containing alkali metal tungsten oxide represented by Formula (I) is used in an amount more than 0.09 wt %, a haze value of the heat shielding material made from the polycarbonate composition would increase so as to decrease transparency.

[Terminal Hydroxy-Containing Polycarbonate]

The terminal hydroxy-containing polycarbonate has a weight average molecular weight ranging from 15,000 to 50,000, and has a terminal hydroxy amount ranging from 2 ppm to 1,000 ppm based on a weight of the terminal hydroxy-containing polycarbonate. When the terminal hydroxy amount of the terminal hydroxyl-containing polycarbonate is more than 1,000 ppm, a product made from the polycarbonate composition has inferior mechanical properties such as impact strength. When the terminal hydroxy amount of the terminal hydroxyl-containing polycarbonate is less than 2 ppm, the polycarbonate composition has inferior fluidity which makes forming into the product difficult.

Preferably, the terminal hydroxy-containing polycarbonate has a weight average molecular weight ranging from 23,000 to 50,000. The terminal hydroxy amount of the terminal hydroxy-containing polycarbonate ranges preferably from 30 ppm to 350 ppm, and more preferably from 50 ppm to 200 ppm based on a weight of the terminal hydroxy-containing polycarbonate.

The terminal hydroxy-containing polycarbonate may be obtained by subjecting a dihydroxy aromatic compound and a precursor of a carbonate compound to interfacial polymerization, melting polymerization, or solid phase polymerization. Examples of the precursor of the carbonate compound include, but are not limited to, phosgene and carbonate compound.

Preferably, the terminal hydroxy-containing polycarbonate is obtained by esterification and polymerization of the dihydroxy aromatic compound and the carbonate compound.

The dihydroxy aromatic compound is selected from the group consisting of 2,2-bis(4-hydroxyphenyl)propane, halogenated bisphenol, hydroquinone, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, 2,2-bis(3,5-dibromo-4-hydroxyphenyl)propane, and combinations thereof, and is not limited thereto. The dihydroxy aromatic compound may be used alone or in admixture. The dihydroxy aromatic compound may be a homopolymer of the abovementioned compounds, a copolymer of the abovementioned compounds, or combinations thereof. Preferably, the dihydroxy aromatic compound is 2,2-bis(4-hydroxyphenyl)propane.

The carbonate compound is selected from the group consisting of diphenyl carbonate, dimethyl carbonate, diethyl carbonate, and combinations thereof, and is not limited thereto. The carbonate compound may be used alone or in admixture.

[Halogen-Containing Alkali Metal Tungsten Oxide]

The halogen-containing alkali metal tungsten oxide is represented by Formula (I):

$$M_xWO_{3-x}L_y \quad (I)$$

where M represents an alkali metal; L represents halogen; $0.001 \leq x \leq 1$, and $0 < y \leq 0.5$.

The halogen-containing alkali metal tungsten oxide of Formula (I) has an absorption wavelength ranging from 900 nm to 2,600 nm.

Preferably, M represents cesium or rubidium.

Preferably, the halogen-containing alkali metal tungsten oxide of Formula (I) is used in an amount ranging from 0.01 wt % to 0.05 wt % based on a total weight of the polycarbonate composition, such that absorption of excess heat that may cause product softening may be avoided.

The halogen-containing alkali metal tungsten oxide of Formula (I) may be prepared by known methods. For example, a halogen salt and an alkali metal salt may be mixed with a precursor of tungsten oxide to conduct reduction reaction with hydrogen. Examples of the precursor of tungsten oxide include, but are not limited to, ammonium metatungstate, ammonium orthotungstate, alkali metal tungstate, tungstic acid, tungsten oxychloride, tungsten alkoxide, tungsten oxycarbide, other tungsten-containing salts, or combinations thereof. Examples of the halogen salt include, but are not limited to, ammonium halide, an organic (alkyl) ammonium salt, tungsten halide, other halogen-containing salts, or combinations thereof. Examples of the alkali metal salt include, but are not limited to, alkali metal carbonate, alkali metal bicarbonate, alkali metal nitrate, alkali metal nitrite, alkali metal hydroxide, an alkali metal halide salt, alkali metal sulfate, alkali metal sulfite, or combinations thereof. The reduction reaction is conducted at a temperature ranging from 300° C. to 800° C.

Preferably, the halogen-containing alkali metal tungsten oxide of Formula (I) is selected from the group consisting of $Cs_{0.33}WO_{2.97}Cl_{0.03}$, $Cs_{0.33}WO_{2.95}Cl_{0.05}$, $Cs_{0.33}WO_{2.8}Cl_{0.2}$, $Cs_{0.33}WO_{2.7}Cl_{0.3}$, $Cs_{0.33}WO_{2.5}Cl_{0.5}$, $Cs_{0.33}WO_{2.95}Br_{0.05}$, $Cs_{0.33}WO_{2.95}F_{0.05}$, $Rb_{0.33}WO_{2.95}Cl_{0.05}$, and combinations thereof.

The polycarbonate composition optionally contains additives as long as the intended effects of the polycarbonate composition according to this invention are not impaired. The additives may be used alone or in admixture. Examples of the additives include, but are not limited to, a silicone oil, an inorganic additive, a thermal stabilizer, an antioxidant, a light stabilizer, a flame retardant, a lubricant, a pigment, a dye, and the like. Examples of the inorganic additive include, but are not limited to, a glass fiber, a carbon fiber, talc, silicon dioxide, mica, aluminium oxide, and the like.

There is no particular limitation for preparing the polycarbonate composition according to this invention, as long as the terminal hydroxy-containing polycarbonate and the halogen-containing alkali metal tungsten oxide of Formula (I) could be mixed well. The polycarbonate composition may be prepared using the following equipments: a high-speed mixer, a double screw extruder, a single screw extruder, or other known mixers.

[Heat Shielding Material]

The heat shielding material according to this invention is formed from the abovementioned polycarbonate composition.

There is no particular limitation for preparing the heat shielding material. For example, the polycarbonate composition may be injected by an injection molding machine, or may be extruded by an extruder, thereby forming various types of products. Examples of the heat shielding material include, but are not limited to, a window, a vehicle window, a sun shading apparatus, a safety glass, a bullet-proof glass, or the like. The haze value of the heat shielding material ranges from 1.5% to 6.0%. The heat shielding material made from the polycarbonate composition satisfies a relationship of:

$$(T+S) > 45 \times W_1 + 134\%,$$

where T represents a value of visible light transmittance, S represents a value of infrared shielding ratio, and $W_1$ represents a value of a weight percentage of the halogen-containing alkali metal tungsten oxide. Preferably, a sum of the visible light transmittance and the infrared shielding ratio of the heat shielding material is above 135.1%. When the sum of the visible light transmittance and the infrared shielding ratio is bigger, the effect of the heat shielding material is better, and a balance between the transparency and the effect of heat shielding could be achieved.

The following examples are provided to illustrate the preferred embodiments of the invention, and should not be construed as limiting the scope of the invention.

EXAMPLES

Preparation of Polycarbonate Composition and Heat Shielding Material

Example 1

6 kg (99.99 parts by weight) of the terminal hydroxy-containing polycarbonate (commercially available from Chi Mei Corporation, product name: PC-110U, terminal hydroxy concentration: 167 ppm, weight average molecular weight: 26,500) was introduced into a double screw extruder (made by W & P, temperature: 270° C.) through a main hopper, and then a 25 wt % solution of 0.04 part by weight of $Cs_{0.33}WO_{2.97}Cl_{0.03}$ in toluene (available from Industrial Technology Research Institute, product name: MCL-ISC-TOL) was introduced into the double screw extruder for compounding through a side feed so as to obtain the polycarbonate composition of the present invention. Thereafter, the polycarbonate composition was further processed into granules.

The granules of the polycarbonate composition were injected into an injection molding machine (made by JSW, temperature: 290° C. to obtain a heat shielding material having a thickness of 3 mm so as to conduct the following evaluations, the results of which are shown in Table 1.

Examples 2 to 4 and Comparative Examples 1 to 3

The method for preparing the polycarbonate composition and the heat shielding material of each of Examples 2 to 4 and Comparative Examples 1 to 3 was identical to that for Example 1, except that the amounts of the terminal hydroxy-containing polycarbonate composition and $Cs_{0.33}WO_{2.97}Cl_{0.03}$ shown in Table 1 were used. The same evaluations were conducted for the polycarbonate composition and the heat shielding material, and the results are shown in Table 1.

Evaluation Methods

1. Infrared Light Shielding Ratio (Referred to as Rir, %) and Visible Light Transmittance (Referred to as T, %):

Each of the heat shielding materials of Examples 1 to 4 and Comparative Examples 1 to 3 was emitted with light in a wavelength range of from 380 nm to 2,000 nm. The visible light transmittance and infrared light transmittance were calculated in accordance with ISO 9050. The visible light transmittance was calculated in a wavelength range from 380 nm to 780 nm, and the infrared light transmittance was calculated in a wavelength range from 780 nm to 2,000 nm. The infrared shielding ratio was calculated as follows:

Infrared Shielding Ratio($Rir$,%)=100%−Infrared Light Transmittance %

2. Heat Shielding Effect:

Each of the heat shielding materials of Examples 1 to 4 and Comparative Examples 1 to 3 was cut into a sample having a length of 10 cm, a width of 10 cm, and a thickness of 3 mm. A wooden box having a length of 60 cm, a width of 60 cm, and a height of 60 cm was provided with an opening with a diameter of 8 cm and was placed under an environment of 25° C. A thermometer was installed in the center of the wooden box. Each of the samples of Examples 1 to 4 and Comparative Examples 1 to 3 was disposed at the opening of the wooden box.

A 120 W halogen lamp was disposed at a position of 20 cm apart from the opening of the wooden box to illuminate each of the samples of Examples 1 to 4 and Comparative Examples 1 to 3 for 8 hours, and the temperature in the wooden box was measured periodically.

3. Vicat Softening Temperature (° C.):

Vicat softening temperature of each of the polycarbonate compositions of Examples 1 to 4 and Comparative Examples 1 to 3 was determined according to ASTM D 1525 and was recorded in ° C.

4. Melt Flow Index (Referred as MI Herein):

The melt flow index of each of the polycarbonate compositions of Examples 1 to 4 and Comparative Examples 1 to 3 was determined according to ASTM D 1238 at 300° C. under a load of 1.2 kg, and was recorded in g/10 min.

5. Impact Strength:

The Izod Notched Impact strength (⅛") of each of the heat shielding materials of Examples 1 to 4 and Comparative Examples 1 to 3 was measured according to ASTM D 256 and was recorded in kg-cm/cm.

6. Haze Value:

The haze value of each of the heat shielding materials of Examples 1 to 4 and Comparative Examples 1 to 3 was measured according to ASTM D 1003. Higher haze value means more inferior transparence of the heat shielding material.

7. Tensile Strength:

The tensile strength of each of the heat shielding materials of Examples 1 to 4 and Comparative Examples 1 to 3 was determined at a test speed of 6 mm/min according to ASTM D 638, and was recorded in kg/cm².

8. Chromaticity:

The chromaticity of each of the heat shielding materials of Examples 1 to 4 and Comparative Examples 1 to 3 was measured using a Minolta chromameter CR-400.

TABLE 1

| Components | | Examples | | | | Comparative Examples | | |
|---|---|---|---|---|---|---|---|---|
| Unit: wt % | | 1 | 2 | 3 | 4 | 1 | 2 | 3 |
| Terminal Hydroxy-containing Polycarbonate | | 99.99 | 99.97 | 99.95 | 99.92 | 100 | 99.995 | 99.9 |
| $Cs_{0.33}WO_{2.97}Cl_{0.03}$ (W) | | 0.01 | 0.03 | 0.05 | 0.08 | 0 | 0.005 | 0.1 |
| Melt Flow Index (MI, g/10 min) | | 10.0 | 10.1 | 10.2 | 10.2 | 10.3 | 10.0 | 11.9 |
| Impact Strength (kg-cm/cm) | | 89.5 | 88.3 | 91.8 | 91.8 | 89.3 | 89.5 | 93.4 |
| Tensile Strength (kg/cm²) | | 618 | 619 | 621 | 621 | 609 | 618 | 657 |
| Vicat Softening Temp. (° C.) | | 150 | 150.1 | 149.8 | 149.8 | 150.7 | 150 | 148 |
| Haze Value (%) | | 1.5 | 1.5 | 2.0 | 6.0 | 1.2 | 1.2 | 17.9 |
| Visible Light Transmittance (T, %) | | 82.1 | 71.7 | 62.3 | 45.4 | 89.2 | 79.9 | 39.4 |
| Infrared Light Shielding Ratio (Rir, %) | | 53 | 82 | 93 | 99 | 21 | 33 | 100 |
| the sum of T and Rir (%) | | 135.1 | 153.7 | 155.3 | 144.4 | 110.2 | 112.9 | 139.4 |
| (45 × W) + 134% (%) | | 134.45 | 135.35 | 136.25 | 137.6 | 134 | 134.225 | 138.5 |
| Heat Shielding Effect (° C.) | 0 hr | 24 | 24 | 24 | — | 24 | — | — |
| | 0.5 hr | 36 | 30.5 | 29.8 | — | 40.5 | — | — |
| | 1 hr | 38 | 33 | 31.4 | — | 43.2 | — | — |
| | 1.5 hr | 39 | 34 | 32.6 | — | 44.2 | — | — |
| | 2 hr | 39.4 | 34.6 | 33 | — | 44.6 | — | — |
| | 2.5 hr | 39.8 | 34.8 | 33 | — | 45 | — | — |

TABLE 1-continued

| Components | Unit: wt % | Examples | | | | Comparative Examples | | |
|---|---|---|---|---|---|---|---|---|
| | | 1 | 2 | 3 | 4 | 1 | 2 | 3 |
| | 3 hr | 40 | 35 | 33 | — | 45.1 | — | — |
| | 4 hr | 40.1 | 35.1 | 33.1 | — | 45.2 | — | — |
| | 8 hr | 40.4 | 35.3 | 33.3 | — | 45.5 | — | — |
| Chromaticity | L | 86.5 | 77.6 | 70.0 | — | 92.3 | 84.0 | 48.7 |
| | a | −2.5 | −6.6 | −9.4 | — | −0.3 | −3.2 | −13.1 |
| | b | 3.7 | 4.0 | 3.9 | — | 3.4 | 3.3 | 0.9 |

[—]: Not measured.

As shown in Table 1, when $Cs_{0.33}WO_{2.97}Cl_{0.03}$ is used in an amount ranging from 0.01 wt % to 0.08 wt % based on a total weight of the polycarbonate composition, the heat shielding material formed therefrom has better haze value which ranges from 1.5% to 6.0% so that the heat shielding material is transparent. Furthermore, the sum of the visible light transmittance and the infrared shielding ratio ranges from 135.1% to 155.3% such that the heat shielding material has superior transparence while having better heat shielding effect.

In Comparative Example 1, $Cs_{0.33}WO_{2.97}Cl_{0.03}$ is not used. Although the haze value is sufficient, the infrared shielding ratio is inferior so that it reflects the heat shielding effect of the heat shielding material formed therefrom is inferior.

In Comparative Example 2, the amount of $Cs_{0.33}WO_{2.97}Cl_{0.03}$ is 0.005 wt %. Although the haze value is sufficient and the infrared shielding ratio is slightly increased, the infrared shielding ratio still does not meet industrial requirements and the sum of the visible light transmittance and the infrared shielding ratio is inferior.

In Comparative Example 3, the amount of $Cs_{0.33}WO_{2.97}Cl_{0.03}$ is 0.1 wt %. Although the infrared shielding ratio is sufficient, the haze value is inferior. This reflects the transparence of the heat shielding material formed therefrom is inferior and does not meet industrial requirements.

To sum up, the heat shielding material formed from the polycarbonate composition according to this invention has superior haze value by using halogen-containing alkali metal tungsten oxide. Meanwhile, the abovementioned heat shielding material satisfies a relationship of:

$$(T+S)>45\times W_1+134\%,$$

where T represents a value of visible light transmittance, S represents a value of infrared shielding ratio, and $W_1$ represents a value of a weight percentage of the halogen-containing alkali metal tungsten oxide.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A polycarbonate composition, comprising:
   a terminal hydroxy-containing polycarbonate; and
   a halogen-containing alkali metal tungsten oxide of formula (I) in an amount ranging from 0.007 wt % to 0.05 wt % based on a total weight of said polycarbonate composition, $$M_xWO_{3-y}L_y \qquad (I)$$

where
   M represents an alkali metal,
   W represents tungsten,
   L represents halogen,
   $0.001 \leq x \leq 1$, and
   $0 < y \leq 0.5$.

2. The polycarbonate composition as claimed in claim 1, wherein said terminal hydroxy-containing polycarbonate has a weight average molecular weight ranging from 15,000 to 50,000, and has a terminal hydroxy amount ranging from 2 ppm to 1,000 ppm based on a weight of said terminal hydroxy-containing polycarbonate.

3. The polycarbonate composition as claimed in claim 2, wherein said terminal hydroxy amount ranges from 30 ppm to 350 ppm.

4. The polycarbonate composition as claimed in claim 1, wherein M represents cesium or rubidium.

5. The polycarbonate composition as claimed in claim 1, wherein said terminal hydroxy-containing polycarbonate is obtained by esterification and polymerization of a dihydroxy aromatic compound and a carbonate compound.

6. The polycarbonate composition as claimed in claim 5, wherein said dihydroxy aromatic compound is selected from the group consisting of 2,2-bis(4-hydroxyphenyl)propane, halogenated bisphenol, hydroquinone, bis(4-hydroxyphenyl)methane, 1,1-bis(4-hydroxyphenyl)cyclohexane, 2,2-bis(3,5-dimethyl-4-hydroxyphenyl)propane, bis(4-hydroxyphenyl)sulfide, bis(4-hydroxyphenyl)sulfone, bis(4-hydroxyphenyl)sulfoxide, bis(4-hydroxyphenyl)ketone, bis(4-hydroxyphenyl)ether, 2,2-bis(3,5-dibromo-4-hydroxyphenyl)propane, and combinations thereof.

7. The polycarbonate composition as claimed in claim 5, wherein said carbonate compound is selected from the group consisting of diphenyl carbonate, dimethyl carbonate, diethyl carbonate, and combinations thereof.

8. A heat shielding material made from the polycarbonate composition as claimed in claim 1.

9. The heat shielding material as claimed in claim 8, which satisfies a relationship of $$(T+S)>45\times W_1+134\%,$$

where
T represents a value of visible light transmittance at thickness of 3 mm,
S represents a value of infrared shielding ratio at thickness of 3 mm, and
$W_1$ represents a value of a weight percentage of said halogen-containing alkali metal tungsten oxide.

10. The heat shielding material as claimed in claim 9, wherein the value of infrared shielding ratio is calculated by 100%−Infrared Light Transmittance %, wherein the infrared light transmittance was calculated in a wavelength range from 780 nm to 2,000 nm.

* * * * *